June 6, 1967  K. W. SCHROEDER ET AL  3,324,354
MAGNETIC TESTING SYSTEM
Filed April 10, 1964  2 Sheets-Sheet 2
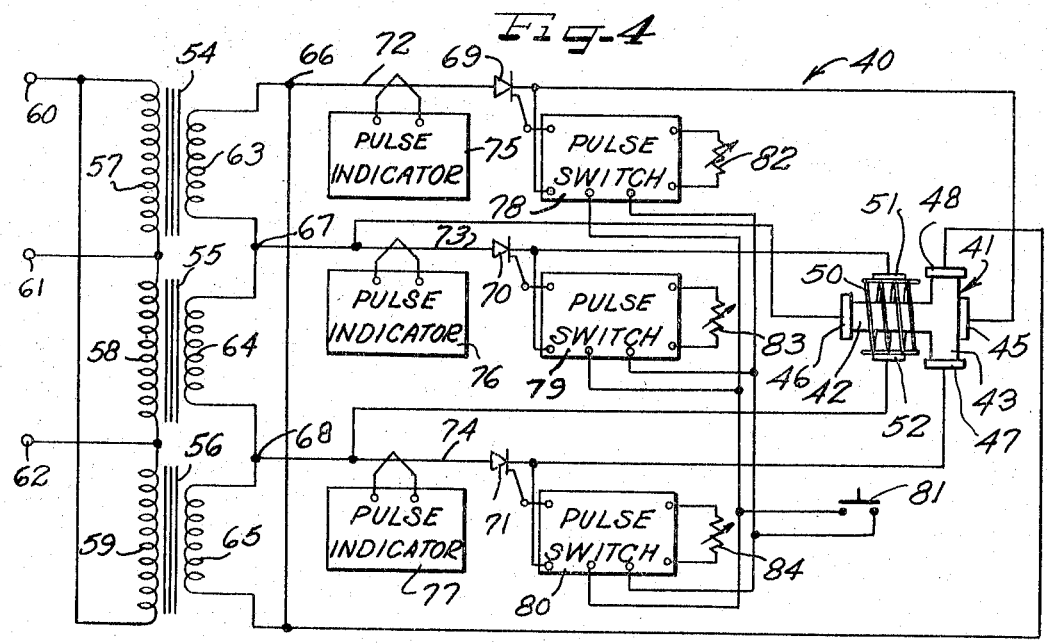
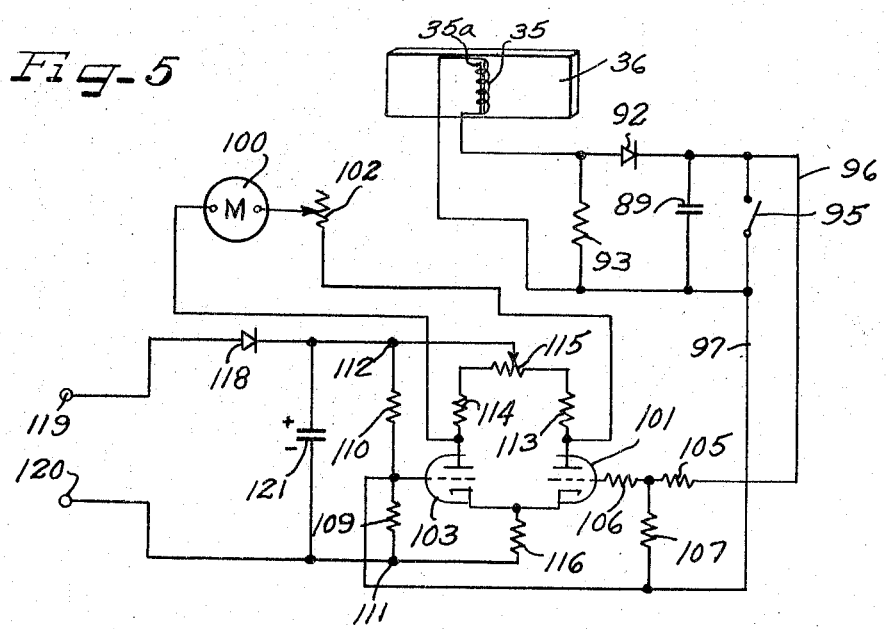
INVENTORS
Kenneth W. Schroeder
Richard H. Huske
BY
ATTORNEYS United States Patent Office 3,324,354
Patented June 6, 1967

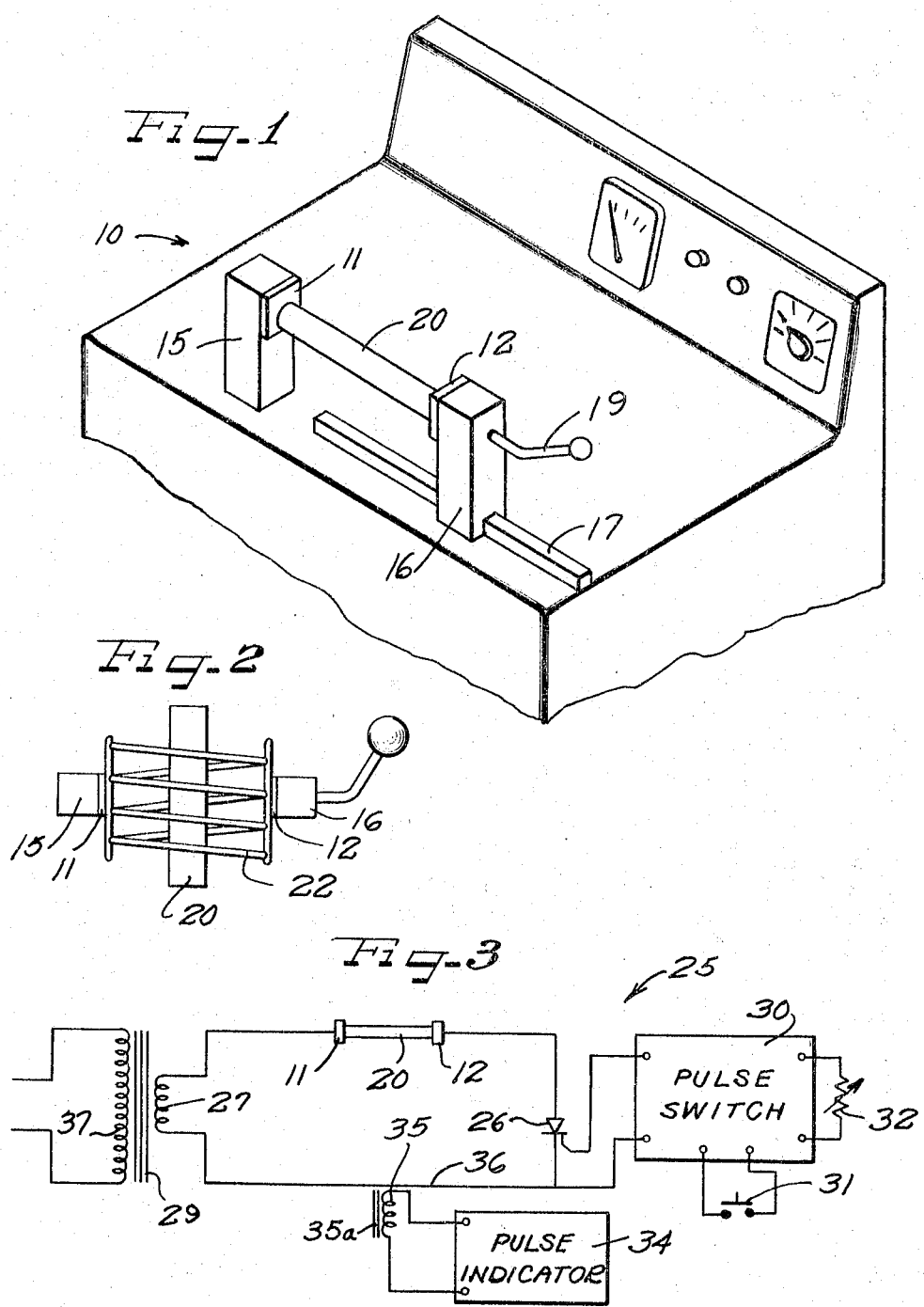

3,324,354
MAGNETIC TESTING SYSTEM
Kenneth W. Schroeder and Richard H. Huske, Arlington Heights, Ill., assignors to Magnaflux Corporation, a corporation of Delaware
Filed Apr. 10, 1964, Ser. No. 358,758
6 Claims. (Cl. 317—123)

This invention relates to a magnetic testing system for inspecting parts and locating defects therein with a high degree of accuracy, reliability and efficiency while using components which are of comparatively small size and weight and relatively inexpensive. The system is particularly advantageous in that a series of similar parts can be uniformly subjected to the same treatment to obtain a high degree of reliability.

Although various features of the invention have other applications, the invention is illustrated herein as applied to a system wherein a part is magnetized to produce localized fields in the region of defects, such localized fields being then detected by distributing magnetic particles over the surface of the part to be attracted and accumulated by said localized fields so as to provide a visual indication of the location of defects.

The part may be magnetized either by passing a high amperage current therethrough, or by passing a current through a conductor or coil within, adjacent to or in surrounding relation to the part. In testing parts of magnetizable materials, it is possible to apply a high amperage current to the part, the conductor or the coil for only a short interval of time, to produce a remanent magnetization of the part, after which it may be inspected. Difficulties are, however, encountered in attempting to apply a high amperage current for a short interval of time. Mechanical breakers for such purpose must have large contact areas and in some cases may arc and cause transient oscillations which produce non-uniformities in the remanent magnetization. If an AC or rectified AC current is applied, as is desirable in many cases, the current must be interrupted at the proper time because if it is interrupted at the wrong point of a cycle, the remanent magnetization may be zero or very small, to prevent detection of defects.

According to an important feature of this invention, a controlled rectifier is used for applying current from a transformer secondary winding for magnetizing a part, and a control signal is applied to a control electrode of the rectifier in a manner such as to initiate conduction of the controlled rectifier during a half cycle of the alternating current and to terminate conduction of the controlled rectifier at the end of a later half cycle of the alternating current, to thereby produce a certain remanent magnetization of the part. Preferably, a half wave system is used with the current being applied only during half cycles of one polarity.

Another important feature of the invention is in the provision of means for controlling the duration of the control signal to control the number of half cycles of current applied for magnetizing the part. This is highly advantageous because in the testing of certain parts it may be desirable to apply a considerable number of half cycles to more uniformly magnetize the part and obtain deeper penetration, while in the testing of other parts, particularly parts having a high retentivity, it may be desirable to apply only a very few number of half cycles, to permit the application of a very high amperage current without overloading the rectifier.

According to a further important feature of the invention, the controlled rectifier is of a type such as a silicon controlled rectifier or an ignitron wherein during application of a control voltage to the control electrode, conduction is initiated upon application of a certain voltage between the main electrodes and wherein such conduction is terminated only after a current between the main electrodes drops below a certain holding value. With such a rectifier, the conduction of the rectifier is automatically terminated at the end of a half cycle and precise timing of the end of the control signal is not required. Such a rectifier is additionally advantageous in that with a comparatively small physical size, extremely large currents can be conducted, particularly when the conduction is for only a few cycles. It is noted that more than one rectifier may be connected in parallel to meet current requirements, and reference herein to one rectifier should be understood as including additional rectifiers which may be connected in parallel therewith.

Another important feature of the invention is in the provision of a multiphase system wherein a part is magnetized in a plurality of directions through controlled rectifiers connected to the secondary windings of transformers having primary windings connected to different phases of a plural phase AC supply, whereby the magnetizing fields in the different directions are applied sequentially and not simultaneously.

This invention contemplates other objects, features and advantages which will become more fully apparent from the following detailed description taken in conjunction with the accompanying drawings which illustrate preferred embodiments and in which:

FIGURE 1 is a perspective view of a magnetic testing apparatus constructed according to the principles of this invention, and illustrates a mode of testing wherein current is passed through a part under test;

FIGURE 2 illustrates the use of an auxiliary test coil for the apparatus of FIGURE 1, to obtain another mode of operation wherein current is passed through the coil to develop a field which is applied to the part;

FIGURE 3 is a schematic electrical diagram for the apparatus of FIGURE 1;

FIGURE 4 is a schematic diagram illustrating a multiphase system wherein magnetizing fields are applied in different directions through a part under test; and FIGURE 5 is an electrical circuit diagram of a current pulse measuring system usable with the magnetic testing systems of FIGURES 1-4 and constructed according to the principles of this invention.

FIGURE 1 illustrates a magnetic particle test unit which is generally designated by reference numeral 10 and comprises a pair of current contactor electrodes 11 and 12 having parallel facing surfaces. The current electrode 11 is secured to a stationary head stock 15, while the current electrode 12 is secured to a movable tailstock 16, which is locked into a desired position along a guide rail 17 by means of a locking arm 19. The guide rail 17 is then electrically connected to the contact or electrode 12 and serves as a conductor for supply of current thereto.

A part 20 can be tested for longitudinal defects by placing it between the two current electrodes 11 and 12; thereupon it will be secured in place by sliding the movable tail stock 16 in a manner as to clamp the part 20 between the current electrodes 11 and 12. A magnetizing current, of predetermined amplitude, is passed from the current electrode 11 through the part 20 into the current electrode 12, thereby causing a circular magnetic field about the longitudinal axis of the part 20. A longitudinal defect in the part 20 will cause an irregularity in the circular magnetic field in the area of the defect, and will produce a localized field which will attract magnetic particles which are applied to the part 20, and produce a clearly visible concentration of the particles along the defect. The particle may preferably be applied in a fluid suspension, but may also be applied in dry form.

To test the part 20 for transverse defects, a magnetizing coil 22 (FIGURE 2) is placed between the current electrodes 11 and 12 and is secured in a manner as described above one end of the coil being electrically connected to the head stock contact 11 and the other end of the coil being electrically connected to the tail stock contact 12. A magnetizing current is passed from the current electrode 11 through the coil 22 and into the current electrode 12, thereby causing a magnetic field to be produced along the axis of the coil 22. When the part 20 is placed into the center of the coil 22 the magnetic field thereof will travel longitudinally through the part 20, after which particles are applied to show the location of defects.

In using the unit to test magnetic materials, the magnetic particles can be applied while the magnetizing current is flowing, which is desirable when the part has a low remanent magnetization characteristic, or the particles can be applied after the magnetizing current has stopped, thereby utilizing the remanent magnetization of the material. The remanent magnetization mode of operation is desirable when the part has a high remanent magnetization characteristic such as to permit its use, in that the magnetizing current need be applied for only a relatively short time interval.

FIGURE 3 shows a pulse circuit 25 for the unit 10, operable to apply a current pulse of controllable duration and with characteristics such as to obtain a high remanent magnetization of a magnetizable part, with a high degree of uniformity and reliability.

The pulse circuit comprises a silicon controlled rectifier 26, having an anode connected to the current electrode 12 and a cathode connected to one lead of a secondary winding 27 of a transformer 29. The current electrode 11 is connected to the other lead of the secondary winding 27, and to the current electrode 12 through the part 20 or through the coil 22. A pulse switch 30 has output terminals connected to the gate and cathode electrodes of the silicon controlled rectifier 26, and operates after closing of a start switch 31 to apply a control signal having a duration controlled by adjustment of a resistor 32. By way of example, the control signal duration is adjustable from 0.04 to 0.5 second. A pulse indicator 34, which is used to measure the magnetizing current, is connected to a coil 35 on a core 35a of magnetic material disposed adjacent and in generally transverse relation to a conductor 36 between the secondary winding 27 and the cathode of the rectifier 26.

The pulse indicator 34 forms no part of the present invention but is highly desirable in providing an accurate indication and the circuit thereof is illustrated in FIGURE 5.

In operation, alternating current is applied to a primary winding 37 of the transformer 29 whereby it is induced into the secondary winding 27. However, no magnetizing current will flow until a control signal from the pulse switch 30 is applied to the silicon controlled rectifier 26. When a control signal is applied to the silicon controlled rectifier 26, magnetizing current will flow through the silicon controlled rectifier during the positive half cycles of the alternating current.

When the control signal is terminated at a time determined by the variable resistor 32, the silicon controlled rectifier 26, if non-conductive because of negative half cycle will remain non-conductive. However, if the silicon controlled rectifier 26 is conductive it will remain conductive during the complete positive half cycle. In either instance, the last pulse of magnetizing current is of maximum amplitude, which is another important feature of this invention.

FIGURE 4 shows a multiphase test unit generally designated by reference numeral 40 and particularly designed for the testing of a blank 41 for a turbine blade, having a vane portion 42 and a root portion 43. Current is passed longitudinally through the blank 41 by means of a pair of contacts or electrodes 45 and 46; current is passed through the root portion 43 by means of a second pair of contacts or electrodes 47 and 48; and a field is induced longitudinally in the vane portions 42 by a surrounding coil 50 connected to a third pair of contacts or electrodes 51 and 52.

The electrodes 45 and 46, 47 and 48 are connected for energization from a three phase supply system. In particular, three transformers 54, 55 and 56 are provided having primary windings 57, 58 and 59 connected in delta to terminals 60, 61 and 62 for connection to a suitable three phase supply, and having secondary windings 63, 64, and 65 connected in delta to circuit points 66, 67 and 68. Contacts 45, 51 and 47 are respectively connected to the cathodes of three silicon controlled rectifiers 69, 70 and 71 having anodes connected through conductors 72, 73 and 74 to the circuit points 66, 67 and 68. Electrodes 48, 46 and 52 are respectively connected directly to the circuit points 66, 67 and 68.

The currents through the conductors 72, 73 and 74 are respectively measured by pulse indicators 75, 76, and 77, each of which may preferably have a circuit which is the same as that of the pulse indicator 34, illustrated in FIGURE 5.

To control operation of the silicon controlled rectifiers 69, 70 and 71, the gate and cathode electrodes thereof are connected to output terminals of the three pulse switches 78, 79 and 80, each of which is operative after closing of a start switch 81 to apply a control signal, the respective durations of the control signal being controlled by adjustment of resistors 82, 83 and 84.

In operation, the start switch 80 is closed to initiate operation of the pulse switches 78, 79 and 80 and to cause application of a control signal to the gate electrodes of the rectifiers 69, 70 and 71, the rectifiers being rendered conductive during the first positive half cycle of the phase voltage applied thereto. As long as the control signal continues, each of the rectifiers continues to conduct during positive half cycles. If the control signal then terminates during the negative half cycle, the corresponding rectifier will not start to conduct during the next subsequent positive half cycle. If, however, the control signal terminates during a positive half cycle, the corresponding rectifier will remain conductive for the duration of the complete positive half cycle and in either instance, the last pulse of magnetizing current is of maximum amplitude. This is very important in insuring effective and uniform remanent magnetization. It is important to note that with the three phase supply, the peaks of the magnetizing fields do not occur simultaneously and are in phased relation, which is important in obtaining proper testing. It should be noted further that a two phase supply may be used (or two phases of a three phase supply), and it is also possible to use more than three phases.

FIGURE 5 shows a circuit of the pulse indicator 34 which forms no part of the present invention, but is highly desirable in providing an accurate indication of the current pulses. The same circuit is usable for the pulse indicators 75, 76 and 77 of the three phase system of FIGURE 4.

As shown, a charging capacitor 89 has one lead connected to one terminal of the coil 35 through a blocking diode 92 and has its other lead connected to the other terminal of the coil 35. A resistor 93 is connected across the secondary winding and serves to suppress transient oscillations. A reset switch 95 is connected between a line 96 and a line 97 connected to the terminals of capacitor 89.

When a magnetizing current passes through the conductor 36, the coil 35 will have induced in it a voltage which is proportional to the magnetizing current. This voltage is then applied to the charging capacitor 89 through the blocking diode 92. The blocking diode 92 prevents the capacitor 89 from discharging through the coil 35 and resistor 93, and the capacitor 89 can only discharge very slowly through conductors 96 and 97 into a high input impedance of a pulse metering circuit.

The pulse metering circuit includes a meter 100 connected to an anode of a triode 101 through a variable resistor 102 and directly connected to an anode of a second triode 103. Both triodes 101 and 103 may be in the same envelope. The line 96 is connected to the control grid of the triode 101 through a pair of resistors 105 and 106, while the line 97 is connected through a resistor 107 to the junction between resistors 105 and 106 and is also connected to the control grid of the triode 103 and through resistors 109 and 110 to circuit points 111 and 112 forming negative and positive DC supply terminals.

A pair of resistors 113 and 114 are connected between the anodes of triodes 101 and 103 and the ends of a potentiometer 115 having a movable contact connected to the circuit point 112. The cathodes of triodes 101 and 103 are connected through a resistor 116 to circuit point 111.

To supply DC to circuit points 111 and 112, a rectifier 118 is connected between circuit point 112 and an AC supply terminal 119, a second AC supply terminal 120 being connected directly to circuit point 111. A filter capacitor 121 is connected between circuit points 111 and 112.

In operation, the variable resistor 115 is adjusted to place the anodes of the triodes 101 and 103 into equal potentials when capacitor 89 is discharged, thereby causing no indication in the meter 100. When a magnetizing current flows through the conductor 36, the capacitor 89 is charged up to a value corresponding to the effective peak value of the voltage. The control grid of the triode 101 will then be placed at a positive potential relative to the potential of the control grid of the triode 103, the triode 101 will conduct more than the triode 103, and a current will pass through the meter 100 proportional to the voltage across the capacitor 89. The resistors in the circuit, particularly the resistor 107, have values which are quite high, and through the action of the triodes and through the use of the unbypassed cathode resistor 116, a very high input impedance is provided in parallel relation to the capacitor 89. Accordingly, after an input voltage pulse is applied to the circuit, the current through the meter 100 will remain quite stable, long enough to enable the operator to read it with a high degree of accuracy.

To prevent the meter reading obtained from one pulse from effecting the meter reading from a subsequent pulse, the reset switch 95 is closed after reading the current from a pulse, to completely discharge the capacitor 89 prior to the next pulse to be measured.

It will be understood that modifications and variations may be effected without departing from the spirit and scope of the novel concepts of this invention.

We claim as our invention:

1. In a system for testing a part of magnetizable material,
   a controlled rectifier having a pair of main electrodes and a control electrode,
   a transformer having primary and secondary windings,
   means connecting one end of said secondary winding to one of said main electrodes,
   connection means connected between the other end of said secondary winding and the other of said main electrodes for defining a current path operative to develop a magnetic field in the part under test,
   means for connecting said primary winding to a source of alternating current, and
   means for applying a control signal to said control electrode to initiate conduction of said controlled rectifier during a half cycle of said alternating current and to terminate conduction of said controlled rectifier at the end of a half cycle of said alternating current to thereby produce a certain remanent magnetization of the part.

2. In a system for testing a part of magnetizable material,
   a controlled rectifier having a pair of main electrodes and a control electrode,
   a transformer having primary and secondary windings,
   means connecting one end of said secondary winding to one of said main electrodes,
   connection means connected between the other end of said secondary winding and the other of said main electrodes for defining a current path operative to develop a magnetic field in the part under test,
   means for connecting said primary winding to a source of alternating current,
   means for applying a control signal to said control electrode to initiate conduction of said controlled rectifier during a half cycle of said alternating current and to terminate conduction of said controlled rectifier at the end of a half cycle of said alternating current to thereby produce a certain remanent magnitization of the part, and
   means for controlling the duration of said control signal to control the number of half cycles of current applied in magnetizing the part.

3. In a system for testing a part of magnetizable material,
   a controlled rectifier having a pair of main electrodes and a control electrode,
   a transformer having primary and secondary windings,
   means connecting one end of said secondary winding to one of said main electrodes,
   connection means connected between the other end of said secondary winding and the other of said main electrodes for defining a current path operative to develop a magnetic field in the part under test,
   means for connecting said primary winding to a source of alternating current, and
   means for applying a control signal to said control electrode to initiate conduction of said controlled rectifier during a half cycle of one polarity of said alternating current and to terminate conduction of said controlled rectifier at the end of a half cycle of said one polarity of said alternating current to thereby produce a certain remanent magnetization of the part,
   the current flow from said secondary winding being interrupted during half cycles of said alternating current of the opposite polarity.

4. In a system for testing a part of magnetizable material,
   a controlled rectifier having a pair of main electrodes and a control electrode,
   a transformer having primary and secondary windings,
   means connecting one end of said secondary winding to one of said main electrodes,
   connection means connected between the other end of said secondary winding and the other of said main electrodes for defining a current path operative to develop a magnetic field in the part under test,
   means for connecting said primary winding to a source of alternating current,
   means for applying a control signal to said control electrode to initiate conduction of said controlled rectifier during a half cycle of said alternating current and to terminate conduction of said controlled rectifier at the end of a half cycle of said alternating current to thereby produce a certain remanent magnetization of the part,
   said controlled rectifier being of a type wherein during application of a control voltage to said control electrode conduction is initiated upon application of a certain voltage between said main electrodes and wherein conduction is thereafter terminated only after current between said main electrodes drops below a certain holding value, whereby conduction of said rectifier is terminated at the end of a half cycle without precise timing of the ending of said control signal.

5. A system as defined in claim 4, wherein said controlled rectifier is a silicon controlled rectifier.

6. In a system for testing a part of magnetizable material,
- a plurality of controlled rectifiers each having a pair of main electrodes and a control electrode,
- a plurality of transformers each having primary and secondary windings,
- means connecting one end of each of said secondary windings to one of said main electrodes of an associated one of said controlled rectifiers,
- a plurality of connection means connected between the other ends of said secondary windings and the others of said main electrodes for defining a plurality of current paths operative to develop magnetic fields in different directions in the part under test,
- means for connecting said primary windings to different phases of a multiphase source of alternating current, and
- means for applying control signals to said control electrodes to initiate conduction of said controlled rectifiers during different phase half cycles of said alternating current and to terminate conduction of said controlled rectifiers at the ends of half cycles of said different phases of said alternating current to thereby produce certain remanent magnetizations in different directions of the part.

References Cited
UNITED STATES PATENTS
2,764,733    9/1956    De Forest _____ 324—38

OTHER REFERENCES
Applications and Circuit Design Notes, "A Survey of Some Circuit Applications of the Silicon Controlled Switch and Silicon Controlled Rectifier," Solid State Products Inc., Feb. 12, 1959, bulletin D420—02—59.

SCR Manual: General Electric, 2nd edition, 1961.

MILTON O. HIRSHFIELD, *Primary Examiner.*

J. A. SILVERMAN, *Assistant Examiner.*